United States Patent
Hong

(10) Patent No.: US 12,408,021 B2
(45) Date of Patent: Sep. 2, 2025

(54) COMMUNICATION PROCESSING METHOD, COMMUNICATION PROCESSING APPARATUS AND STORAGE MEDIUM

(71) Applicant: BEIJING XIAOMI MOBILE SOFTWARE CO., LTD., Beijing (CN)

(72) Inventor: Wei Hong, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 401 days.

(21) Appl. No.: 17/928,888

(22) PCT Filed: Jun. 24, 2020

(86) PCT No.: PCT/CN2020/098252
§ 371 (c)(1),
(2) Date: Nov. 30, 2022

(87) PCT Pub. No.: WO2021/258370
PCT Pub. Date: Dec. 30, 2021

(65) Prior Publication Data
US 2023/0232211 A1    Jul. 20, 2023

(51) Int. Cl.
*H04W 8/22*    (2009.01)
(52) U.S. Cl.
CPC .................... *H04W 8/22* (2013.01)
(58) Field of Classification Search
CPC ........... H04W 8/22; H04W 8/24; G06N 20/00
See application file for complete search history.

(56) References Cited

U.S. PATENT DOCUMENTS

| | | | |
|---|---|---|---|
| 2003/0051026 A1* | 3/2003 | Carter | H04L 63/0263 709/224 |
| 2015/0312787 A1 | 10/2015 | Das et al. | |
| 2018/0268302 A1 | 9/2018 | Tosh | |
| 2019/0075506 A1 | 3/2019 | Coglon et al. | |
| 2019/0297529 A1 | 9/2019 | Hampel et al. | |
| 2020/0133597 A1 | 4/2020 | Ishida | |
| 2020/0260515 A1* | 8/2020 | Hashmi | H04W 76/27 |
| 2022/0337677 A1 | 10/2022 | Hong | |
| 2023/0353460 A1* | 11/2023 | Zhou | G06N 3/0455 |
| 2023/0362625 A1* | 11/2023 | Kumar | H04W 72/51 |
| 2024/0224148 A1* | 7/2024 | Kitagawa | H04L 41/16 |
| 2024/0298169 A1* | 9/2024 | Wang | H04W 24/02 |

FOREIGN PATENT DOCUMENTS

| | | |
|---|---|---|
| CN | 101471871 A | 7/2009 |
| CN | 105450663 A | 3/2016 |

(Continued)

OTHER PUBLICATIONS

International Search Report issued in Application No. PCT/CN2020/098252 dated Mar. 23, 2021 with English translation,(4p).

(Continued)

*Primary Examiner* — Congvan Tran
(74) *Attorney, Agent, or Firm* — Arch & Lake LLP

(57) ABSTRACT

The present disclosure relates to a communication processing method, a communication processing apparatus, and a storage medium. The communication processing method includes: in response to changes in the AI capabilities of a terminal, sending AI capability information, wherein the AI capability information includes information related to the changes in the AI capabilities of the terminal.

14 Claims, 6 Drawing Sheets

(56) References Cited

FOREIGN PATENT DOCUMENTS

| CN | 108616346 A | 10/2018 |
|----|-------------|---------|
| CN | 108647085 A | 10/2018 |
| CN | 110506259 A | 11/2019 |
| CN | 110750206 A | 2/2020 |
| CN | 110785984 A | 2/2020 |
| CN | 110786030 A | 2/2020 |
| WO | 2020043211 A1 | 3/2020 |
| WO | 2020077523 A1 | 4/2020 |
| WO | 2020080989 A1 | 4/2020 |

OTHER PUBLICATIONS

Notification to Grant Patent Right for Invention issued in CN Application No. 202080001403.1 dated Jan. 6, 2024 with English translation, (6p).

Ericsson: "UE CSI Reporting Capability," 3GPP TSG-RAN WG1, Meeting AH 1801, R1-1800698, Vancouver, Canada, Jan. 22-26, 2018, (4p).

Intel Corporation: "Discussion on Enhanced CRS-IM and SU-MIMO IM UE capabilities," 3GPP TSG-RAN WG4, Meeting #82bis, R4-1702906, Spokane, USA, Apr. 3-7, 2017, (4p).

Chen Ling et al., "Design and implementation of obtaining 4G user identity information," Information Technology, vol. 04, Apr. 24, 2018, (5p).

Li Qian et al., "Cell Association Based on Evolutionary Game in Heterogeneous Network," Video Engineering, vol. 39, Issue 17, Sep. 2, 2015, (4p).

Extended European Search Report of EP Application No. 20942323.5 dated Jun. 21, 2023 (11p).

\* cited by examiner

COMMUNICATION PROCESSING METHOD, COMMUNICATION PROCESSING APPARATUS AND STORAGE MEDIUM

CROSS-REFERENCE

The present application is a U.S. National Stage of International Application No. PCT/CN2020/098252, filed on Jun. 24, 2020, the entire content of which is incorporated herein by reference for all purposes.

TECHNICAL FIELD

The present disclosure relates to the field of communication technologies, and in particular, to a communication processing method, a communication processing apparatus, and a storage medium.

BACKGROUND

With the development of wireless communication technologies and computer technologies, the importance of Artificial Intelligence (AI) on the terminal side has become increasingly prominent. In the related arts, AI has been applied to many fields such as camera, voice and security of terminals such as smart phones to enhance users' experience. With the maturity and commercial use of 5G, remarkable features of 5G networks, such as high speed, high reliability, and low latency, allow terminals equipped with AI capabilities to have an opportunity to intelligently collaborate with cloud devices equipped with AI capabilities to achieve more functions and bring a better experience to the users. For example, with the advent of the 5G era, applications of AI in the terminals will achieve more seamless cloud collaboration, make interaction manners tend to be natural, and make interconnection and collaboration between smart terminals more satisfactory.

As processing capabilities of the terminals become increasingly powerful, the terminals with the AI capabilities can process more and more data and make quick feedback and decisions.

SUMMARY

According to a first aspect of the present disclosure, there is provided a communication processing method, including: sending AI capability information in response to a change in an AI capability of a terminal, wherein the AI capability information includes information related to the change in the AI capability of the terminal.

According to a second aspect of the present disclosure, there is provided a communication processing method, including: receiving AI capability information, wherein the AI capability information includes information related to a change in an AI capability of a terminal; and determining information matching the changed AI capability of the terminal based on the AI capability information.

According to a third aspect of the present disclosure, there is provided a communication processing apparatus, including:
- a processor; and a memory configured to store instructions executable by the processor;
- wherein the processor is configured to perform the communication processing method according to the first aspect or any implementation of the first aspect.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and, together with the description, serve to explain principles of the present disclosure.

DETAILED DESCRIPTION

Figure 1:
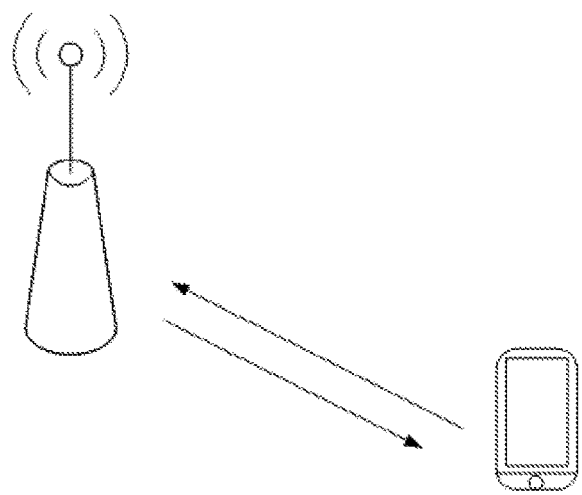
FIG. 1 is an architectural diagram showing a wireless communication system according to an embodiment of the present disclosure.

Reference will now be made in detail to embodiments, examples of which are illustrated in the drawings. The following description refers to the drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with some aspects related to the present disclosure as recited in the appended claims.

A communication processing method provided by embodiments of the present disclosure may be applied in a wireless communication system shown in FIG. 1. Referring to FIG. 1, a terminal and a network device are included in the wireless communication system. Information is transmitted and received between the terminal and the network device via radio resources.

It will be understood that the wireless communication system shown in FIG. 1 is only schematically illustrated, and the wireless communication system may also include other network devices, such as a core network device, a wireless relay device, and a wireless backhaul device, etc., which are not shown in FIG. 1. Embodiments of the present disclosure do not limit the number of network devices and the number of terminals included in the wireless communication system.

It is further understood that the wireless communication system of the embodiments of the present disclosure is a network that provides wireless communication functions. The wireless communication system may employ different communication technologies, such as Code Division Multiple Access (CDMA), Wideband Code Division Multiple Access (WCDMA), Time Division Multiple Access (TDMA), Frequency Division Multiple Access (FDMA), Orthogonal Frequency-Division Multiple Access (OFDMA), Single Carrier FDMA (SC-FDMA), or Carrier Sense Multiple Access with Collision Avoidance. Depending on the capacity, rate, and delay of different networks, the networks can be classified as a 2G (second generation) network, a 3G network, a 4G network, or a future evolved network such as a 5G network, which can also be called a New Radio (NR) network. For ease of description, the present disclosure will sometimes refer to the wireless communication network as simply network.

Further, the network device involved in the present disclosure may also be referred to as a wireless access network device. The wireless access network device may be: a base station, an evolved node B (base station), a home base station, an access point (AP) in a wireless fidelity (WiFi) system, a wireless relay node, a wireless backhaul node, a transmission point (TP), or a transmission and reception point (TRP), or a gNB in the NR system, or a component or part of devices constituting a base station, etc. The network device may also be a vehicle-mounted device when the system is a Vehicle-to-Everything (V2X) communication system. It should be understood that in the embodiments of the present disclosure, the specific technology and the specific device form used for the network device are not limited.

Further, the terminal involved in the present disclosure may also be referred to as a terminal device, User Equipment (UE), Mobile Station (MS), Mobile Terminal (MT), etc. The terminal is a device that provides voice and/or data connectivity to a user. For example, the terminal may be a handheld device with a wireless connection function, or a vehicle-mounted device, etc. Currently, some examples of the terminal are: mobile phone, Pocket Personal Computer (PPC), pocket PC, Personal Digital Assistant (PDA), laptop, tablet, a wearable device, or a vehicle-mounted device, etc. In addition, the terminal device may also be a vehicle-mounted device when the system is a Vehicle-to-Everything (V2X) communication system. It should be understood that in the embodiments of the present disclosure, the specific technology and the specific device form used for the terminal are not limited.

A terminal and a network device involved in embodiments of the present disclosure have AI capabilities. The terminal with the AI capability can quickly respond to user needs and quickly display processed images, videos, voice and text information to a user in a low power consumption and low cost manner, which is suitable for completing an AI inference task. A cloud device with an AI capability is used to realize multi-terminal data aggregation, has advantages in data throughput, processing speed and the like, and is suitable for completing an AI model training task. Therefore, a collaborative AI processing mode in the cloud will play an important role in model training, data inference and the like. After a command sent by the user is initially processed by a terminal-side smart chip with an AI capability, real-time interaction with the cloud device with the AI capability is performed through the 5G network, and then the 5G network is used to feed back a processing result of the cloud device with the AI capability to the user, which can improve a data processing capability and effectively reduce latency.

In the related arts, interoperability between the network device and the terminal is not friendly for the AI capability, leading to a low communication efficiency. For example, the AI capability of the terminal with the AI capability may change, and after the AI capability changes, the network device cannot change a business, service, configuration, etc. for the terminal based on the changed AI capability in time.

Embodiments of the present disclosure provide a communication processing method. When the terminal with the AI capability sends AI capability information when the AI capability changes, and the AI capability information includes the information related to a change in the AI capability of the terminal, so that the network device can subsequently determine information matching the changed AI capability for the terminal based on the AI capability information, and then the terminal with the AI capability selects a wireless network matching its own AI capability for access, improving the usage efficiency for the AI capability between the terminal and the network device.

Figure 2:
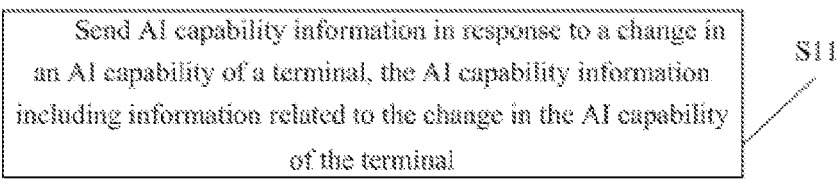
FIG. 2 is a flowchart showing a communication processing method according to an embodiment of the present disclosure.

FIG. 2 is a flowchart showing a communication processing method according to an embodiment of the present disclosure, which communication processing method can be applied to a terminal, and as shown in FIG. 2, the communication processing method includes the following step S11.

In the step S11, in response to a change in an AI capability of a terminal, AI capability information is sent.

In embodiments of the present disclosure, the AI capability information includes information related to the change in the AI capability of the terminal.

In embodiments of the present disclosure, the terminal sends the AI capability information in response to the change in the AI capability of the terminal, so that when the AI capability changes, the terminal can update the changed AI capability of the terminal to a network device in real time.

In an implementation of embodiments of the present disclosure, in response to the change in the AI capability of the terminal, the terminal may send the AI capability information based on signaling. In one manner, the AI capability information is sent through a Media Access Control Control Element (MAC CE). Alternatively, in another manner, the AI capability information is sent through Radio Resource Control (RRC) signaling.

For example, after the AI capability of the terminal changes, the terminal can inform the network device through the signaling. The terminal informs the network device of its latest AI capability through the MAC CE signaling, such as AI MAC CE. Alternatively, the terminal may also inform the network device of its latest AI capability through the RRC signaling, such as UEAssistanceInformation. After receiving the AI capability reported by the terminal through the signaling, the network device can configure a corresponding business, service, and configuration for the AI terminal.

A protocol specifies the MAC CE as shown in Table 1 below.

TABLE 1

Values of LCID for UL-SCH

| Index | LCID values |
|---|---|
| 0 | CCCH of size 64 bits (referred to as "CCCH1" in TS 38.331 [5]) |
| 1-31 | Identity of the logical channel |
| 32 | ASR (AI Status Report) |
| 33 | Extended logical channel ID field (two-octet eLCID field) |
| 34 | Extended logical channel ID field (one-octet eLCID field) |
| 35-39 | Reserved |
| 40 | Sidelink Configured Grant Confirmation |
| 41 | Truncated Sidelink BSR |
| 42 | Sidelink BSR |
| 43 | Multiple Entry Configured Grant Confirmation |
| 44 | LBT failure (four octets) |
| 45 | LBT failure (one octet) |
| 46 | SCell BFR (four octets $C_i$) |
| 47 | SCell BFR (one octet $C_i$) |
| 48 | Truncated SCell BFR (four octets $C_i$) |
| 49 | Truncated SCell BFR (one octet $C_i$) |
| 50 | Number of Desired Guard Symbols |
| 51 | Pre-emptive BSR |
| 52 | CCCH of size 48 bits (referred to as "CCCH" in TS 38.331 [5]) |
| 53 | Recommended bit rate query |
| 54 | Multiple Entry PHR (four octets $C_i$) |
| 55 | Configured Grant Confirmation |
| 56 | Multiple Entry PHR (one octet $C_i$) |
| 57 | Single Entry PHR |
| 58 | C-RNTI |
| 59 | Short Truncated BSR |
| 60 | Long Truncated BSR |
| 61 | Short BSR |
| 62 | Long BSR |
| 63 | Padding |

Figure 3:
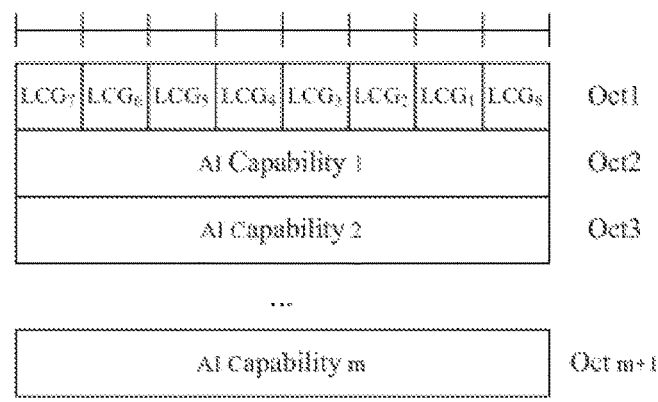
FIG. 3 is a schematic diagram showing a format of a Long ASR MAC CE according to an embodiment of the present disclosure.

In embodiments of the present disclosure, the MAC CE used by the terminal to send the AI capability information to the network device may be a MAC CE based on an AI Status Report (ASR). In an implementation of embodiments of the present disclosure, the AI capability information is sent through a Long ASR MAC CE. FIG. 3 is a schematic diagram showing a format of a Long ASR MAC CE according to an embodiment of the present disclosure. Referring to FIG. 3, the Long ASR MAC CE includes a plurality of Octs, such as Oct1, Oct2, Oct3 . . . Octm+1. One Oct (such as Oct1) is used to represent a Logical Channel Group (LCG), such as LCG1, LCG2, LCG3, LCG4, LCG5, LCG6 and LCG7. The Long ASR MAC CE also includes Octs for indicating the AI capability, such as Oct2, Oct3 . . . Octm+1 in FIG. 3, and each Oct correspondingly indicates one AI capability. Therefore, in embodiments of the present disclosure, there are a plurality of manners for responding the AI capability information sent by the terminal, and the AI capability information is sent through the Long ASR MAC CE.

Figure 4:
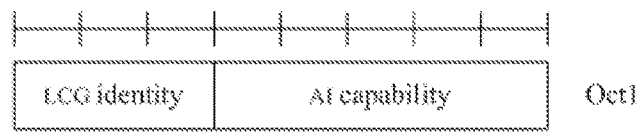
FIG. 4 is a schematic diagram showing a format of a Short ASR MAC CE according to an embodiment of the present disclosure.

In an implementation of embodiments of the present disclosure, the AI capability information is sent through a Short ASR MAC CE. FIG. 4 is a schematic diagram showing a format of a Short ASR MAC CE according to an embodiment of the present disclosure. Referring to FIG. 4, the Short ASR MAC CE includes a LCG identity and the AI capability, and the LCG identity and the AI capability can be represented by one Oct. The Short ASR MAC CE can be used to indicate one AI capability. Therefore, in embodiments of the present disclosure, there is one manner for responding the AI capability information sent by the terminal, and the AI capability information is sent through the Short ASR MAC CE.

Figure 5:
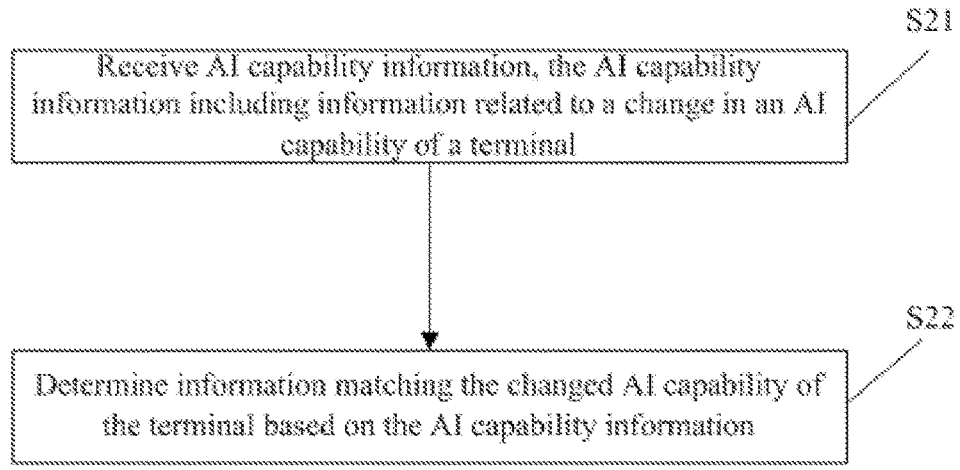
FIG. 5 is a flowchart showing a communication processing method according to an embodiment of the present disclosure.

FIG. 5 is a flowchart showing a communication processing method according to an embodiment of the present disclosure, which communication processing method can be applied to a network device, and as shown in FIG. 5, the communication processing method includes the following steps S21 and S22.

In the step S21, AI capability information is received, and the AI capability information includes information related to a change in an AI capability of a terminal.

In the step S22, information matching the changed AI capability of the terminal is determined based on the AI capability information.

In embodiments of the present disclosure, the information matching the changed AI capability of the terminal may be, for example, a business, service, and/or configuration.

The terminal with the AI capability reports its own AI capability information to the network device. After receiving the AI capability information, the network device can configure the terminal with business, service and/or configuration information that matches the AI capability information. Alternatively, the network device may change the business, service and/or configuration information, etc. that have been configured for the terminal based on the received AI capability information.

In an implementation of embodiments of the present disclosure, the network device receives the AI capability information of the terminal based on the signaling. In one manner, the AI capability information is received through the MAC CE. For example, the network device receives the latest AI capability of the terminal through the AI MAC CE. Alternatively, in another manner, the AI capability information is received through the RRC signaling. For example, the network device receives the latest AI capability of the terminal through UEAssistanceInformation. After receiving the AI capability reported by the terminal through the signaling, the network device can configure or change the corresponding business, service and configuration for the AI terminal.

In embodiments of the present disclosure, the communication processing methods involved in the foregoing embodiments are described below in combination with practical applications.

In an implementation, the terminal with the AI capability reports its own AI capability value to the network device in embodiments of the present disclosure. For example, the AI capability value may include computing power. In embodiments of the present disclosure, the AI capability information sent by the terminal with the AI capability in response to a change in the AI capability value may include the changed AI capability value of the terminal, which can also be understood that the AI capability information includes information indicating the changed AI capability value of the terminal.

In embodiments of the present disclosure, when the terminal with the AI capability sends the AI capability information including the AI capability value of the terminal, the sending may be based on unicast signaling, which can also be understood that the AI capability information including the AI capability value of the terminal is carried in the unicast signaling for sending.

In embodiments of the present disclosure, the unicast signaling for sending the information of the changed AI capability value of the terminal is referred to as first unicast signaling for convenience of description.

The first unicast signaling involved in embodiments of the present disclosure may be terminal capability indication signaling. Alternatively, the first unicast signaling may also be RRCSetupComplete signaling. Alternatively, the first unicast signaling may also be UEAssistanceInformation signaling. Alternatively, the first unicast signaling may also be RRCReconfigurationComplete signaling.

In an example, the first unicast signaling used by the terminal with the AI capability in different communication scenarios may be different. For example, when the terminal with the AI capability initially accesses the network device, the first unicast signaling may be the RRCSetupComplete signaling. When the terminal with the AI capability performs cell handover, the first unicast signaling may also be the RRCReconfigurationComplete signaling. When the terminal with the AI capability enters an ACTIVE state from an IDLE state, the first unicast signaling may also be the RRCSetupComplete signaling.

In embodiments of the present disclosure, the network device may receive the AI capability information based on the first unicast signaling, and the AI capability information includes the AI capability value of the terminal.

After receiving the AI capability information including the AI capability value of the terminal based on the first unicast signaling, the network device may configure the business, service and/or configuration information matching the AI capability value for the terminal with the AI capability based on the AI capability value.

In an embodiment, the information indicating the changed AI capability value of the terminal includes the changed AI capability value or an offset value between the changed AI capability value and an initial AI capability value.

In another embodiment, the terminal with the AI capability reports information characterizing that the terminal has the AI capability to the network device. In embodiments of the present disclosure, the terminal with the AI capability sends the AI capability information in response to the change in the AI capability, and the sent AI capability information may include indication information characterizing that the terminal has the AI capability.

In embodiments of the present disclosure, when the terminal with the AI capability sends the indication information characterizing that the terminal has the AI capability, the sending may be based on the unicast signaling, which can also be understood that the indication information including the information characterizing that the terminal has the AI capability is carried in the unicast signaling for sending.

In embodiments of the present disclosure, the unicast signaling for sending the indication information characterizing that the terminal has the AI capability is referred to as second unicast signaling for convenience of description.

The second unicast signaling involved in embodiments of the present disclosure may be terminal capability indication signaling. Alternatively, the second unicast signaling may also be the RRCSetupComplete signaling. Alternatively, the second unicast signaling may also be the UEAssistanceInformation signaling.

In an example, the second unicast signaling used by the terminal with the AI capability in different communication scenarios may also be different. The second unicast signaling that matches a communication scenario of the terminal may be determined in a similar manner to the manner of the determination of the first unicast signaling based on the communication scenario involved in the above embodiments, thus the reference may be made to the relevant description of the above embodiments, which is not limited by embodiments of the present disclosure here.

In an implementation of embodiments of the present disclosure, the network device may receive the AI capability information based on the second unicast signaling, and the AI capability information includes the information characterizing that the terminal has the AI capability.

In an implementation of embodiments of the present disclosure, the network device may send a request for requesting the terminal to report the AI capability of the terminal to the terminal, so that the terminal can report an AI capability type and/or the AI capability value that the terminal has after receiving the request. In embodiments of the present disclosure, the request for requesting to report the AI capability type and/or the AI capability value that the terminal has is referred to as a first request for the convenience of description.

The network device sends the first request, and the first request is used to request to report the AI capability type and/or the AI capability value that the terminal has.

In embodiments of the present disclosure, the network device may send the first request through UECapabilityEnquiry signaling, UEInformationRequest signaling, or RRCReconfiguration signaling to request the terminal to report the AI capability type and/or the AI capability value that the terminal has.

The terminal receives the first request, and the first request is used to request to report the AI capability type and/or the AI capability value that the terminal has, and the terminal reports the AI capability type and/or the AI capability value that the terminal has.

In embodiments of the present disclosure, the terminal may receive the first request through the UECapabilityEnquiry signaling, the UEInformationRequest signaling, or the RRCReconfiguration signaling, and the terminal may report the AI capability of the terminal after receiving the first request. In an example, the terminal may report the AI capability of the terminal through one or more of UECapabilityInformation signaling, UEInformationResponse signaling, RRCReconfigurationComplete signaling or UEAssistanceInformation signaling. The network device receives the AI capability reported by the terminal based on one or more of the UECapabilityInformation signaling, the UEInformationResponse signaling, the RRCReconfigurationComplete signaling or the UEAssistanceInformation signaling.

Figure 6:
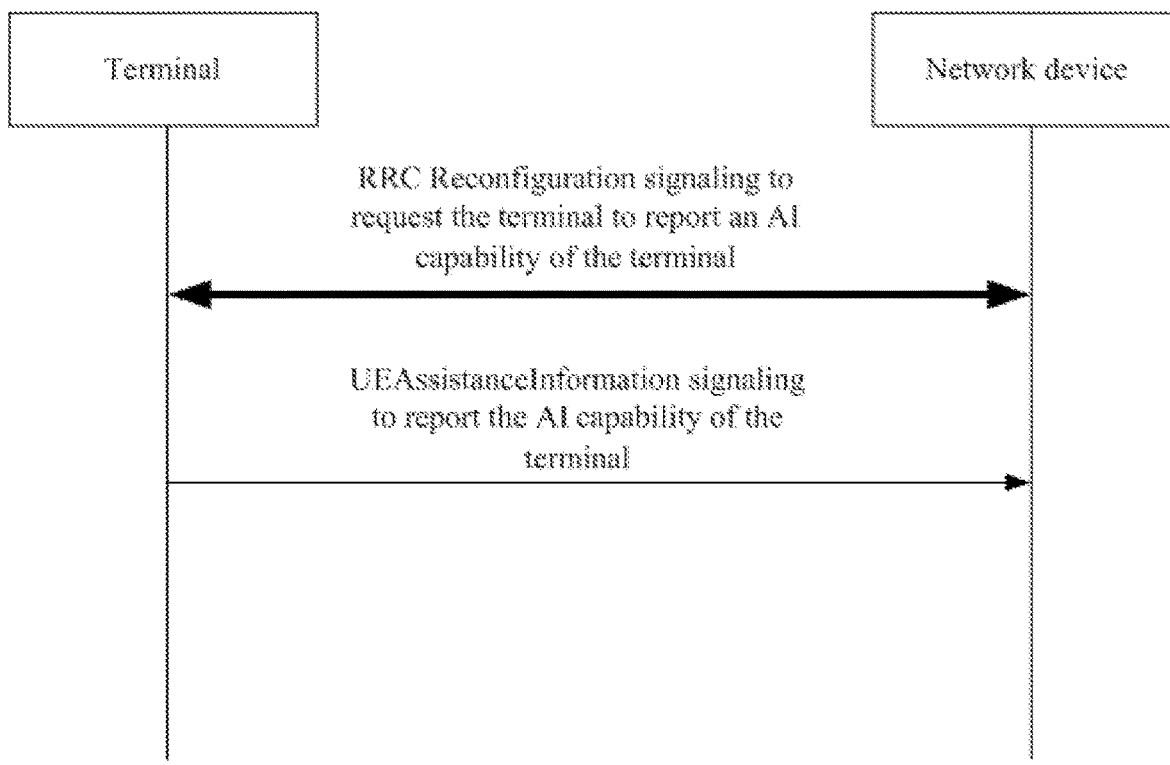
FIG. 6 shows a schematic diagram of a process of reporting an AI capability of a terminal through a request between a network device and the terminal in an embodiment of the present disclosure.

In an example, the first request is RRC Reconfiguration signaling. FIG. 6 shows a schematic diagram of a process of reporting an AI capability of a terminal through a request between a network device and the terminal in an embodiment of the present disclosure. Referring to FIG. 6, the network device sends the first request through the RRC Reconfiguration signaling to request the terminal to report the AI capability of the terminal. After receiving the first request through the RRC Reconfiguration signaling, the terminal determines that the network device is requesting to acquire the AI capability of the terminal reported by the terminal. The terminal may report the AI capability of the terminal based on the UEAssistanceInformation signaling.

Figure 7:
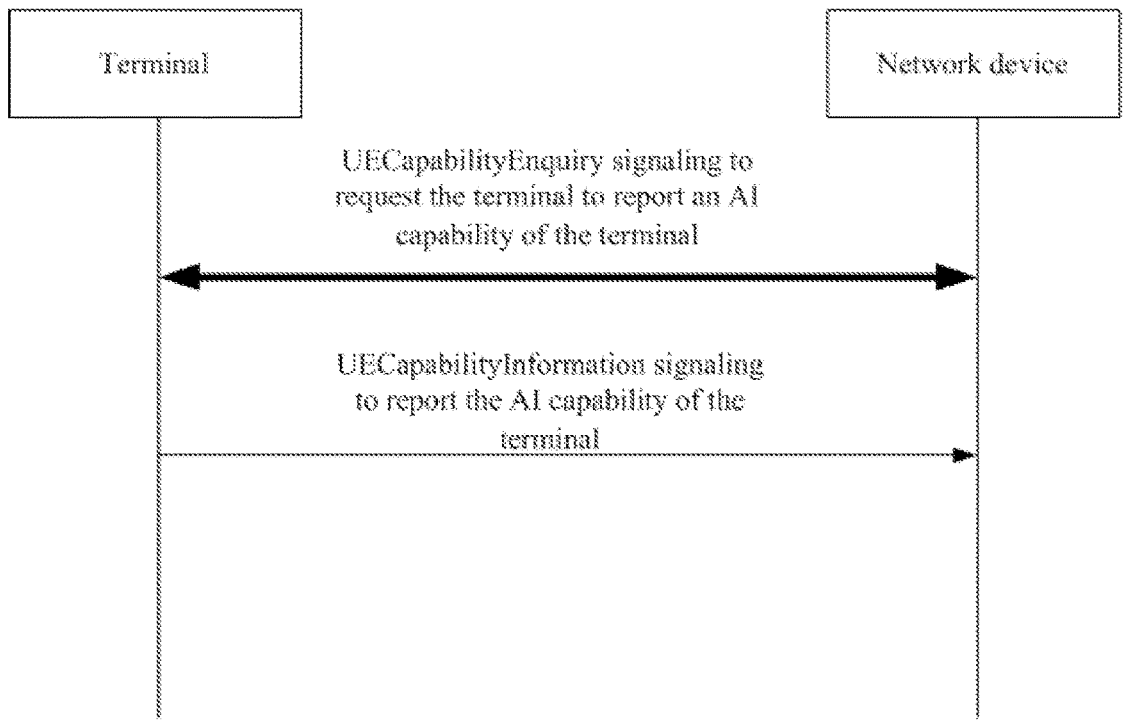
FIG. 7 shows a schematic diagram of a process of reporting an AI capability of a terminal through a request between a network device and the terminal in an embodiment of the present disclosure.

In another example, the first request is the UECapabilityEnquiry signaling. FIG. 7 shows a schematic diagram of a process of reporting an AI capability of a terminal through a request between a network device and the terminal in an embodiment of the present disclosure. Referring to FIG. 7, the network device sends the first request through the UECapabilityEnquiry signaling to request the terminal to report the AI capability of the terminal. After receiving the first request through the UECapabilityEnquiry signaling, the terminal determines that the network device is requesting to acquire the AI capability of the terminal reported by the terminal. The terminal may report the AI capability of the terminal based on the UECapabilityInformation signaling.

Figure 8:
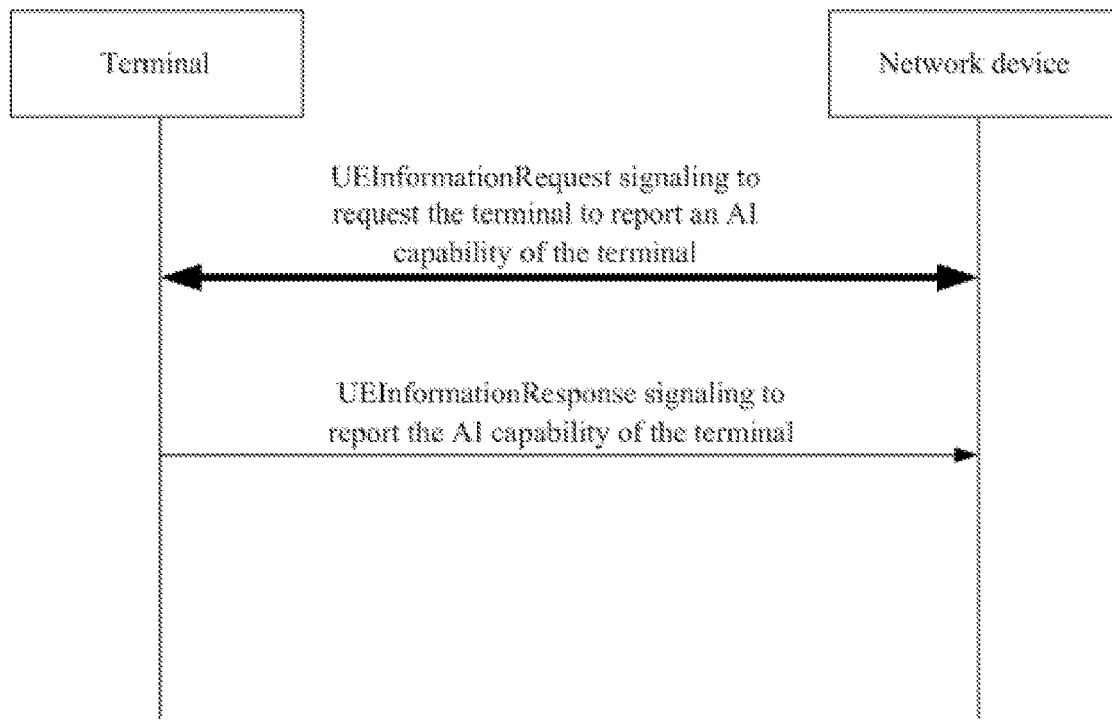
FIG. 8 shows a schematic diagram of a process of reporting an AI capability of a terminal through a request between a network device and the terminal in an embodiment of the present disclosure.

In yet another example, the first request is the UEInformationRequest signaling. FIG. 8 shows a schematic diagram of a process of reporting an AI capability of a terminal through a request between a network device and the terminal in an embodiment of the present disclosure. Referring to FIG. 8, the network device sends the first request through the UEInformationRequest signaling to request the terminal to report the AI capability of the terminal. After receiving the first request through the UEInformationRequest signaling, the terminal determines that the network device is requesting to acquire the AI capability of the terminal reported by the terminal. The terminal may report the AI capability of the terminal based on the UEInformationResponse signaling.

In an implementation of embodiments of the present disclosure, after receiving the AI capability information including the information characterizing that the terminal has the AI capability based on the second unicast signaling, the network device may send the first request to the terminal. The terminal receives the first request, and reports the AI capability that the terminal has after receiving the first request. The network device receives the AI capability reported by the terminal, and configures the business, service and/or configuration information matching the AI capability for the terminal with the AI capability based on the AI capability.

In another implementation, the terminal with the AI capability reports the AI capability type possessed by the terminal to the network device, that is, the terminal with the AI capability reports to the network device what type of the AI capability it has. The terminal reports the AI capability type to the network device, and may temporarily not report an AI capability value corresponding to the AI capability type.

In embodiments of the present disclosure, when the terminal with the AI capability reports the AI capability type that the terminal has to the network device, the reporting may be performed based on the unicast signaling.

In embodiments of the present disclosure, the terminal with the AI capability sends the AI capability information in response to a change in the AI capability type that the terminal has, and the sent AI capability information may include the AI capability type that the terminal has. It can be understood that the information related to the changed AI capability of the terminal included in the AI capability information may characterize an AI capability type after the AI capability type of the terminal changes.

In embodiments of the present disclosure, when the terminal with the AI capability sends the AI capability information including the AI capability type of the terminal, the sending may be based on the unicast signaling, which can also be understood that the AI capability information including the AI capability type is carried in the unicast signaling for sending.

In embodiments of the present disclosure, the unicast signaling for sending the AI capability information including the AI capability type is referred to as third unicast signaling for convenience of description.

The third unicast signaling involved in embodiments of the present disclosure may be terminal capability indication signaling. Alternatively, the third unicast signaling may also be the RRCSetupComplete signaling. Alternatively, the third unicast signaling may also be the UEAssistanceInformation signaling.

In an example, the third unicast signaling used by the terminal with the AI capability in different communication scenarios may also be different. The third unicast signaling that matches a communication scenario of the terminal may be determined in a similar manner to the manner of the determination of the first unicast signaling based on the communication scenario involved in the above embodiments, thus the reference may be made to the relevant description of the above embodiments, which is not limited by embodiments of the present disclosure here.

In embodiments of the present disclosure, the network device may receive the AI capability information through the third unicast signaling, and the AI capability information includes the AI capability type that the terminal has.

The network device may send to the terminal a request for requesting the terminal to report an AI capability value associated with a specified AI capability type based on the AI capability of the terminal required by the network device, so that the terminal reports the AI capability value associated with the specified AI capability type after receiving the request. In embodiments of the present disclosure, the request for requesting to report the AI capability value associated with the specified AI capability type is referred to as a second request for convenience of description.

The network device sends the second request, and the second request is used to request to report the AI capability value associated with the specified AI capability type.

In embodiments of the present disclosure, the network device may send the second request through the UECapabilityEnquiry signaling, the UEInformationRequest signaling, or the RRCReconfiguration signaling to request the terminal to report the AI capability value of the specified AI capability type.

The terminal receives the second request, and the second request is used to request to report the AI capability value associated with the specified AI capability type. The terminal reports the AI capability value associated with the specified AI capability type.

In embodiments of the present disclosure, the terminal may receive the second request through the UECapabilityEnquiry signaling, the UEInformationRequest signaling, or the RRCReconfiguration signaling. After receiving the second request, the terminal may report the AI capability matching the specified AI capability type. In an example, the terminal may report the AI capability matching the specified AI capability type through one or more of the UECapabilityInformation signaling, the UEInformationResponse signaling, the RRCReconfigurationComplete signaling, or the UEAssistanceInformation signaling. The network device receives the AI capability reported by the terminal that matches the specified AI capability type based on one or more of the UECapabilityInformation signaling, the UEInformationResponse signaling, the RRCReconfigurationComplete signaling, or the UEAssistanceInformation signaling.

In an example, the first request is the RRC Reconfiguration signaling. The AI capability value associated with the specified AI capability type is reported based on the UEAssistanceInformation signaling.

In another example, the first request is the UECapabilityEnquiry signaling. The AI capability value associated with the specified AI capability type is reported based on the UECapabilityInformation signaling.

In yet another example, the first request is the UEInformationRequest signaling. The AI capability value associated with the specified AI capability type is reported based on the UEInformationResponse signaling.

In embodiments of the present disclosure, when the terminal reports the AI capability type, the AI capability type may be characterized by a bit sequence. The bit sequence characterizing the AI capability type includes a bit for indicating the AI capability type, and different values of the bit are used to characterize different AI capability types. In other words, the terminal can indicate its own AI capability through the bit. For example, different values of three bits are defined to characterize the AI capability that the terminal has. For example, 000 represents AI capability #1 that the terminal has, 001 represents AI capability #2 that the terminal has . . . . When the terminal reports the AI capability that the terminal has to the network device, the AI capability that the terminal has is indicated by the corresponding bit value. The network device receives the bit value sent by the terminal, and can determine the AI capability that the terminal has based on a predefined correspondence between the bit value and the AI capability.

In an implementation of embodiments of the present disclosure, after receiving the AI capability information including the AI capability type of the terminal based on the third unicast signaling, the network device may send the second request to the terminal. The terminal receives the second request, and reports the AI capability that matches the specified AI capability type after receiving the second request. The network device receives the AI capability reported by the terminal, and configures the business, service and/or configuration information matching the AI capability for the terminal with the AI capability based on the AI capability.

The AI capability information involved in embodiments of the present disclosure is characterized by a capability quantification value, and different capability quantification values correspond to different AI capability types and/or different AI capability values. For example, in embodiments of the present disclosure, the AI capability that the terminal has may be indicated by a predefined integer value, that is, which integer value represents which AI capability is pre-agreed. In other words, the AI capability of the terminal is characterized by the integer value, and different integer values correspond to different AI capabilities. When the terminal reports the AI capability that the terminal has to the network, the AI capability that the terminal has is indicated by the corresponding integer value. The network device receives the integer value sent by the terminal, and can determine the AI capability that the terminal has based on a predefined correspondence between the integer value and an AI model type.

In an implementation of embodiments of the present disclosure, when the terminal updates the AI capability and/or the AI capability value of the terminal to the network device, the updating may be directly performed through the capability quantization value matching the current AI capability type and AI capability value. In an example, the terminal reports the AI capability information to the network device, and the AI capability information includes a capability quantization value matching the changed AI capability type and/or a capability quantization value matching the changed AI capability value.

In another implementation of embodiments of the present disclosure, different capability quantization values correspond to different AI capability types and/or different AI capability values, and there are offsets between the different capability quantization values. For example, the capability quantization value is represented by 1, 2, 3 . . . N, each value in 1, 2, 3 . . . N corresponds to one AI capability value, and the offsets between the capability quantization values corresponding to different AI capability values has the minimum unit of 1. For example, the capability quantization value is represented by 00, 01, 11 . . . , and each of 00, 01, 11 . . . matches one AI capability type, and there are offsets between capability quantization values corresponding to different AI capability types.

When the terminal updates the changed AI capability type and/or AI capability value of the terminal to the network device, the updating may be performed through the offset of the capability quantization value that matches the current AI capability type and/or AI capability value. In an example, the terminal reports the AI capability information to the network device, and the AI capability information includes an offset of the capability quantization value of the changed AI capability type relative to the capability quantization value of the initial AI capability type, and/or an offset of the capability quantization value of the changed AI capability value relative to the capability quantization value of the initial AI capability value. For example, if the capability quantization value matching the current AI capability value is 2, and the offset of the capability quantization value included in the AI capability information is +4, then the capability quantization value matching the changed AI capability value is 6.

It should be noted that those skilled in the art can understand that various implementations/embodiments involved in the foregoing embodiments of the present disclosure may be used in conjunction with the foregoing embodiments, or may be used independently. Whether used alone or in conjunction with the foregoing embodiments, implementation principles are similar. In embodiments of the present disclosure, some of the embodiments are described by means of implementations that are used together. Please note that those skilled in the art can understand that such illustrative description are not intended to limit the embodiments of the present disclosure.

In embodiments of the present disclosure, when the terminal with the AI capability sends the AI capability information when the AI capability changes, and the AI capability information includes the information related to the changed AI capability of the terminal, so that the network device can subsequently determine the information matching the changed AI capability for the terminal based on the AI capability information, and then the terminal with the AI capability selects a wireless network matching its own AI capability for access, improving the usage efficiency for the AI capability between the terminal and the network device.

Based on the same idea, embodiments of the present disclosure also provide a communication processing apparatus.

It should be understood that, in order to achieve the aforementioned functions, the communication processing apparatus provided by embodiments of the present disclosure contains hardware structures and/or software modules corresponding to the respective functions. In combination with the units and algorithmic steps of each example disclosed in the embodiments of the present disclosure, the embodiments of the present disclosure can be implemented in the form of hardware or a combination of hardware and computer software. Whether a particular function is implemented in hardware or computer software driving hardware depends on the particular application and design constraints of the technical solutions. A person skilled in the art may use a different approach for each particular application to implement the described functions, and such implementation should not be considered as outside the scope of the technical solutions of the embodiments of the present disclosure.

Figure 9:
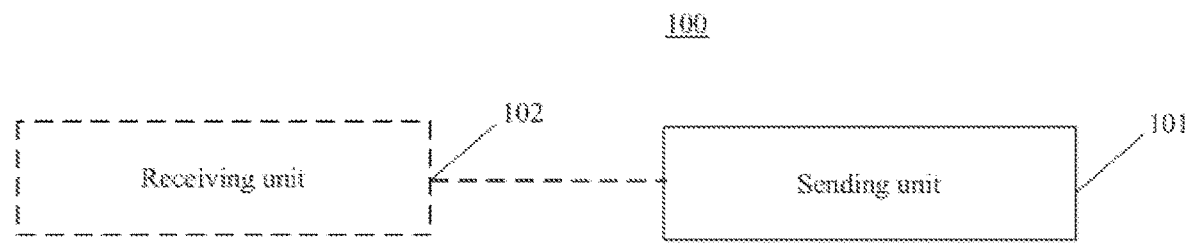
FIG. 9 is a block diagram showing a communication processing apparatus according to an embodiment of the present disclosure.

FIG. 9 is a block diagram showing a communication processing apparatus according to an embodiment of the present disclosure, and referring to FIG. 9, the communication processing apparatus 100 includes a sending unit 101. The sending unit 101 is configured to send AI capability information in response to a change in an AI capability of a terminal, and the AI capability information includes information related to the change in the AI capability of the terminal.

In an implementation, the sending unit 101 is configured to: send the AI capability information through MAC CE, or send the AI capability information through RRC signaling.

In an implementation, the AI capability information includes information indicating a changed AI capability value of the terminal. The sending unit 101 is configured to send the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability. The sending unit 101 is configured to send the AI capability information based on second unicast signaling.

In an implementation, the communication processing 100 apparatus further includes a receiving unit 102, configured to receive a first request, and the first request is used to request to report an AI capability type and/or an AI capability value that the terminal has. The sending unit 101 is further configured to report the AI capability type and/or the AI capability value that the terminal has.

In an implementation, the AI capability information includes the AI capability type that the terminal has. The sending unit 101 is configured to send the AI capability information based on third unicast signaling.

In an implementation, the communication processing apparatus 100 further includes a receiving unit 102, configured to receive a second request, and the second request is used to request to report an AI capability value associated with a specified AI capability type. The sending unit 101 is further configured to report the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

Figure 10:
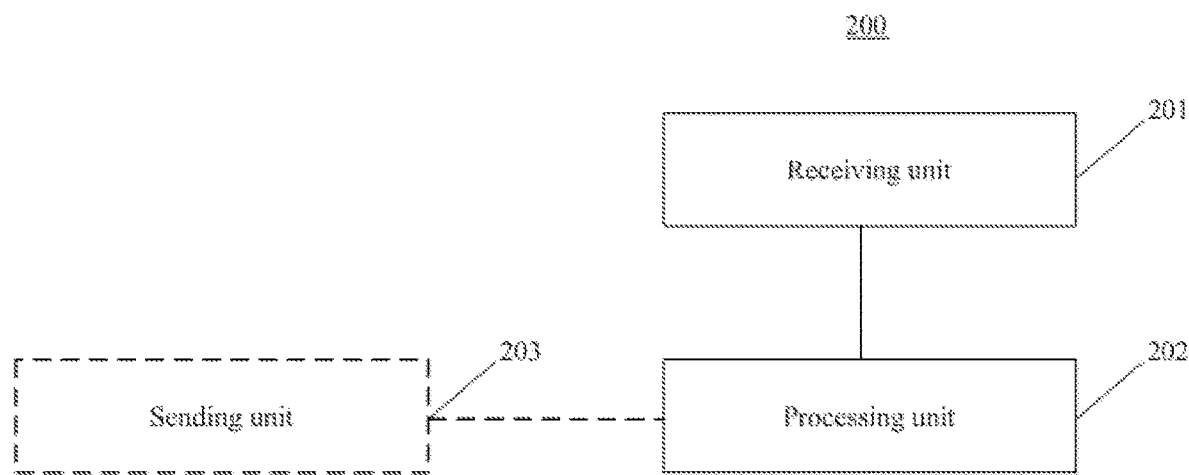
FIG. 10 is a block diagram showing a communication processing apparatus according to an embodiment of the present disclosure.

FIG. 10 is a block diagram showing a communication processing apparatus according to an embodiment of the present disclosure, and referring to FIG. 10, the communication processing apparatus 200 includes a receiving unit 201 and a processing unit 202.

The receiving unit 201 is configured to receive AI capability information, wherein the AI capability information includes information related to a change in an AI capability of a terminal. The processing unit 202 is configured to determine information matching the changed AI capability of the terminal based on the AI capability information.

In an implementation, the receiving unit 201 is configured to: receive the AI capability information through a MAC CE, or receive the AI capability information through RRC signaling.

In an implementation, the AI capability information includes information indicating a changed AI capability value of the terminal. The receiving unit 201 is configured to receive the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability. The receiving unit 201 is configured to receive the AI capability information based on second unicast signaling.

In an implementation, the communication processing apparatus 200 further includes a sending unit 203, configured to send a first request, and the first request is used to request to report an AI capability type and/or an AI capability value that the terminal has. The receiving unit 201 is further configured to receive the AI capability type and/or the AI capability value that the terminal has.

In an implementation, the AI capability information includes the AI capability type that the terminal has. The receiving unit 201 is configured to receive the AI capability information based on third unicast signaling.

In an implementation, the communication processing apparatus 200 further includes a sending unit 203, configured to send a second request, and the second request is used to request to report an AI capability value associated with a specified AI capability type. The receiving unit 201 is further configured to receive the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

Regarding the apparatuses in the above embodiments, a specific manner in which each module performs operations has been described in detail in embodiments of the related methods, and detailed descriptions will be omitted here.

Figure 11:
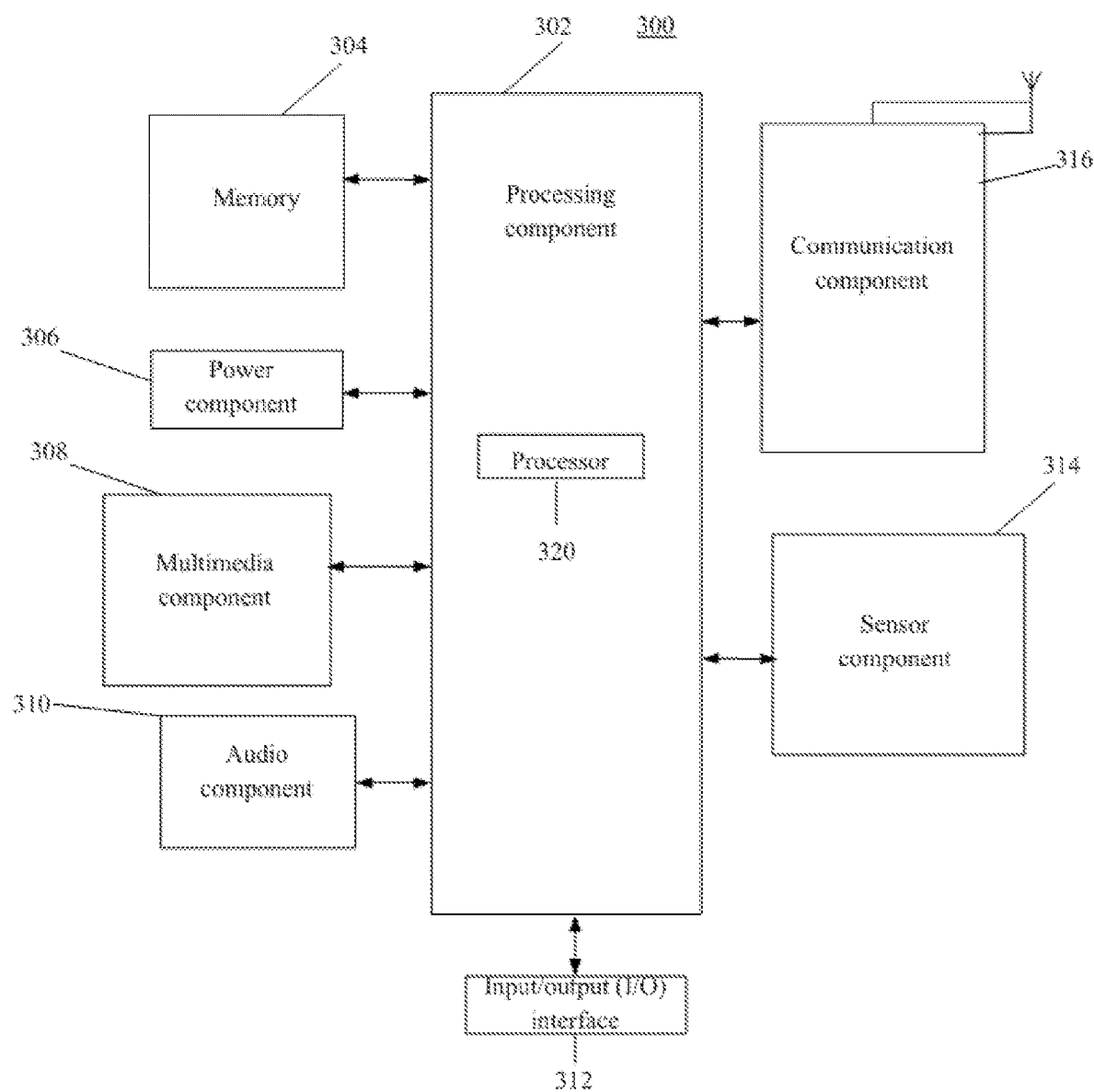
FIG. 11 is a block diagram showing a device for communication processing according to an embodiment of the present disclosure.

FIG. 11 is a block diagram showing a device 300 for communication processing according to an embodiment of the present disclosure. For example, the device 300 may be a mobile phone, a computer, a digital broadcasting terminal, a messaging device, a game console, a tablet device, a medical device, a fitness device, a personal digital assistant, etc.

Referring to FIG. 11, the device 300 may include one or more of the following components: a processing component 302, a memory 304, a power component 306, a multimedia component 308, an audio component 310, an input/output (I/O) interface 312, a sensor component 314, and a communication component 316.

The processing component 302 typically controls the overall operations of the device 300, such as the operations associated with display, telephone calls, data communications, camera operations, and recording operations. The processing component 302 can include one or more processors 320 to execute instructions to perform all or part of the steps in the above described methods. Moreover, the processing component 302 can include one or more modules to facilitate the interaction between the processing component 302 and other components. For example, the processing component 302 can include a multimedia module to facilitate the interaction between the multimedia component 308 and the processing component 302.

The memory 304 is configured to store various types of data to support the operation of the device 300. Examples of such data include instructions for any application or method operated on the device 300, such as the contact data, the phone book data, messages, pictures, videos, and the like. The memory 304 can be implemented by any type of volatile or non-volatile storage device, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 306 provides power to various components of the device 300. The power component 306 can include a power management system, one or more power sources, and other components associated with the generation, management, and distribution of power in the device 300.

The multimedia component 308 includes a screen providing an output interface between the device 300 and the user. In some embodiments, the screen can include a liquid crystal display (LCD) and a touch panel (TP). If the screen includes the touch panel, the screen can be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 308 includes a front camera and/or a rear camera. When the device 300 is in an operation mode, such as a photographing mode or a video mode, the front camera and/or the rear camera can receive external multimedia datum. Each of the front camera and the rear camera may be a fixed optical lens system or have focus and optical zoom capability.

The audio component 310 is configured to output and/or input an audio signal. For example, the audio component 310 includes a microphone (MIC) configured to receive an external audio signal when the device 300 is in an operation mode, such as a call mode, a recording mode, and a voice recognition mode. The received audio signal may be further stored in the memory 304 or sent via the communication component 316. In some embodiments, the audio component 310 also includes a speaker for outputting the audio signal.

The I/O interface 312 provides an interface between the processing component 302 and peripheral interface modules, such as a keyboard, a click wheel, buttons, and the like. These buttons may include, but are not limited to, a home button, a volume button, a starting button, and a locking button.

The sensor component 314 includes one or more sensors for providing status assessments of various aspects of the device 300. For example, the sensor component 314 can detect an open/closed status of the device 300, relative positioning of components, such as the display and the keypad of the device 300. The sensor component 314 can also detect a change in position of one component of the device 300 or the device 300, the presence or absence of user contact with the device 300, an orientation, or an acceleration/deceleration of the device 300, and a change in temperature of the device 300. The sensor component 314 can include a proximity sensor configured to detect the presence of nearby objects without any physical contact. The sensor component 314 can also include a light sensor, such as a CMOS or CCD image sensor, configured to use in imaging applications. In some embodiments, the sensor component 314 can also include an accelerometer sensor, a gyroscope sensor, a magnetic sensor, a pressure sensor, or a temperature sensor.

The communication component 316 is configured to facilitate wired or wireless communication between the device 300 and other devices. The device 300 can access a wireless network based on a communication standard, such as WiFi, 2G or 3G, or a combination thereof. In an embodiment of the present disclosure, the communication component 316 receives broadcast signals or broadcast associated information from an external broadcast management system via a broadcast channel. In an embodiment of the present disclosure, the communication component 316 also includes a near field communication (NFC) module to facilitate short-range communications. For example, the NFC module can be implemented based on a radio frequency identification (RFID) technology, an infrared data association (IrDA) technology, an ultra-wideband (UWB) technology, a Bluetooth (BT) technology, and other technologies.

In an embodiment of the present disclosure, the device 300 may be implemented with one or more application specific integrated circuits (ASICs), digital signal processors (DSPs), digital signal processing devices (DSPDs), programmable logic devices (PLDs), field programmable Gate array (FPGA), controller, microcontroller, microprocessor or other electronic components to perform the above described method.

In an embodiment of the present disclosure, there is also provided a non-transitory computer-readable storage medium including instructions, such as a memory 304 including instructions executable by the processor 320 of the device 300 to perform the above described method. For example, the non-transitory computer readable storage medium may be a ROM, a random access memory (RAM), a CD-ROM, a magnetic tape, a floppy disc, and an optical data storage device.

Figure 12:
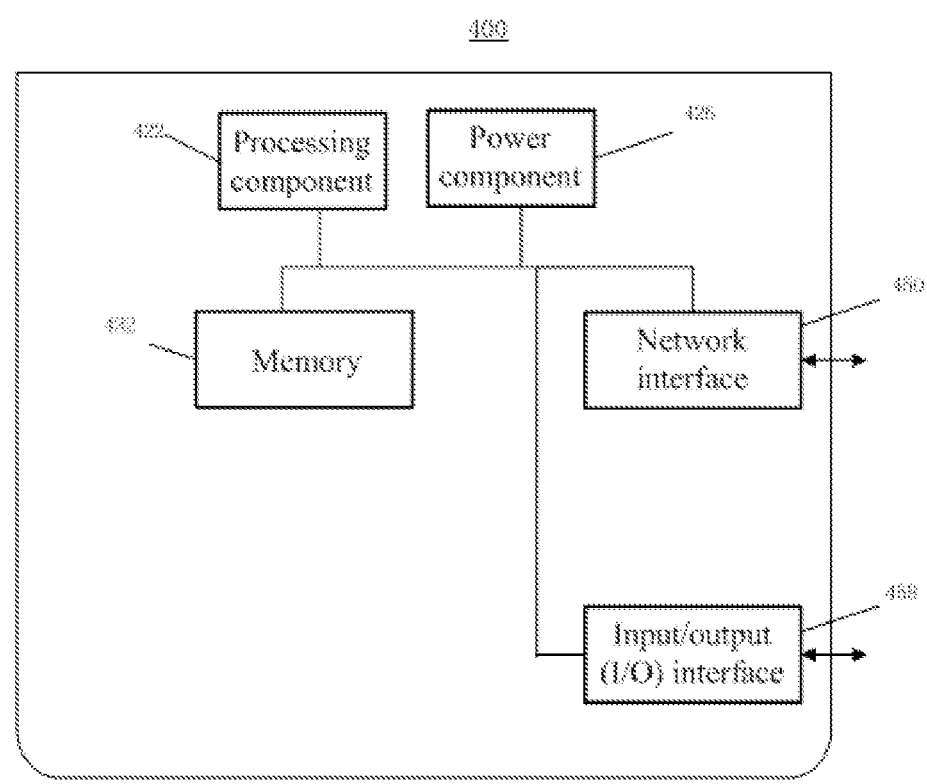
FIG. 12 is a block diagram showing a device for communication processing according to an embodiment of the present disclosure.

FIG. 12 is a block diagram showing a device for communication processing according to an embodiment of the present disclosure. For example, the device 400 may be provided as a network device, such as a base station. With reference to FIG. 12, the device 400 includes a processing component 422 that further includes one or more processors, and a memory resource represented by a memory 432 for storing instructions, such as application programs, executable by the processing component 422. The application programs stored in memory 432 may include one or more modules, each of which corresponds to a set of instructions. Moreover, the processing component 422 is configured to execute instructions to execute the above method.

The device 400 may also include a power component 426 configured to perform power management of the device 400, a wired or wireless network interface 450 configured to connect the device 400 to a network, and an input/output (I/O) interface 458. The device 400 may operate based on an operating system stored in the memory 432, such as Windows Server™, Mac OS X™, Unix™, Linux™, FreeBSD™, or the like.

In an embodiment of the present disclosure, there is also provided a non-transitory computer-readable storage medium including instructions, such as a memory 432 including instructions executable by the processing component 422 of the device 400 to perform the above described method. For example, the non-transitory computer readable storage medium may be a ROM, a random access memory (RAM), a CD-ROM, a magnetic tape, a floppy disc, and an optical data storage device.

The present disclosure provides a communication processing method, a communication processing apparatus and a storage medium.

According to a first aspect of embodiments of the present disclosure, there is provided a communication processing method, including: sending AI capability information in response to a change in an AI capability of a terminal, wherein the AI capability information includes information related to the change in the AI capability of the terminal.

In an implementation, the sending the AI capability information includes: sending the AI capability information through a media access control control element, or sending the AI capability information through radio resource control signaling.

In an implementation, the AI capability information includes information indicating a changed AI capability value of the terminal, and the sending the AI capability information includes sending the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability, and the sending the AI capability information includes sending the AI capability information based on second unicast signaling.

In an implementation, the communication processing method further includes: receiving a first request, wherein the first request is used to request to report an AI capability type and/or an AI capability value that the terminal has; and reporting the AI capability type and/or the AI capability value that the terminal has.

In an implementation, the AI capability information includes the AI capability type that the terminal has, and the sending the AI capability information includes sending the AI capability information based on third unicast signaling.

In an implementation, the communication processing method further includes: receiving a second request, wherein the second request is used to request to report an AI capability value associated with a specified AI capability type; and reporting the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

According to a second aspect of embodiments of the present disclosure, there is provided a communication processing method, including: receiving AI capability information, wherein the AI capability information includes information related to a change in an AI capability of a terminal; and determining information matching the changed AI capability of the terminal based on the AI capability information.

In an implementation, the receiving the AI capability information includes: receiving the AI capability information through a media access control control element, or receiving the AI capability information through radio resource control signaling.

In an implementation, the AI capability information includes information indicating a changed AI capability value of the terminal, and the receiving the AI capability information includes receiving the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability, and the receiving the AI capability information includes receiving the AI capability information based on second unicast signaling.

In an implementation, the communication processing method further includes: sending a first request, wherein the first request is used to request to report an AI capability type and/or an AI capability value that the terminal has; and receiving the AI capability type and/or the AI capability value that the terminal has.

In an implementation, the AI capability information includes the AI capability type that the terminal has, and the receiving the AI capability information includes receiving the AI capability information based on third unicast signaling.

In an implementation, the communication processing method further includes: sending a second request, wherein the second request is used to request to report an AI capability value associated with a specified AI capability type; and receiving the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

According to a third aspect of embodiments of the present disclosure, there is provided a communication processing apparatus, including:

a sending unit, configured to send AI capability information in response to a change in an AI capability of a terminal, wherein the AI capability information includes information related to the change in the AI capability of the terminal.

In an implementation, the sending unit is configured to: send the AI capability information through a media access control control element, or send the AI capability information through radio resource control signaling.

In an implementation, the AI capability information includes information indicating a changed AI capability value of the terminal, and the sending unit is configured to send the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability, and the sending unit is configured to send the AI capability information based on second unicast signaling.

In an implementation, the communication processing apparatus further includes a receiving unit, configured to receive a first request, wherein the first request is used to request to report an AI capability type and/or an AI capability value that the terminal has, and the sending unit is further configured to report the AI capability type and/or the AI capability value that the terminal has.

In an implementation, the AI capability information includes the AI capability type that the terminal has, and the sending unit is configured to send the AI capability information based on third unicast signaling.

In an implementation, the communication processing apparatus further includes a receiving unit, configured to receive a second request, wherein the second request is used to request to report an AI capability value associated with a specified AI capability type, and the sending unit is further configured to report the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

According to a fourth aspect of embodiments of the present disclosure, there is provided a communication processing apparatus, including:

a receiving unit, configured to receive AI capability information, wherein the AI capability information includes information related to a change in an AI capability of a terminal; and a processing unit, configured to determine information matching the changed AI capability of the terminal based on the AI capability information.

In an implementation, the receiving unit is configured to: receive the AI capability information through a media access control control element, or receive the AI capability information through radio resource control signaling.

In an implementation, the AI capability information includes information indicating a changed AI capability value of the terminal, and the receiving unit is configured to receive the AI capability information based on first unicast signaling.

In an implementation, the information indicating the changed AI capability value of the terminal includes: the changed AI capability value or an offset value between the changed AI capability value and an initial AI capability value.

In an implementation, the AI capability information includes indication information characterizing that the terminal has the AI capability, and the receiving unit is configured to receive the AI capability information based on second unicast signaling.

In an implementation, the communication processing apparatus further includes a sending unit, configured to send a first request, wherein the first request is used to request to report an AI capability type and/or an AI capability value that the terminal has, and the receiving unit is further configured to receive the AI capability type and/or the AI capability value that the terminal has.

In an implementation, the AI capability information includes the AI capability type that the terminal has, and the receiving unit is configured to receive the AI capability information based on third unicast signaling.

In an implementation, the communication processing apparatus further includes a sending unit, configured to send a second request, wherein the second request is used to request to report an AI capability value associated with a specified AI capability type, and the receiving unit is further configured to receive the AI capability value associated with the specified AI capability type.

In an implementation, the AI capability type is characterized by a bit sequence, the bit sequence includes a bit for indicating the AI capability type, and different values of the bit are used to characterize different AI capability types.

In an implementation, the AI capability information is characterized by a capability quantification value, and different capability quantification values correspond to different AI capability types and/or different AI capability values.

In an implementation, the AI capability information includes a capability quantization value matching a changed AI capability type, and/or a capability quantization value matching the changed AI capability value.

In an implementation, the AI capability information includes a capability quantization value offset of the changed AI capability type relative to an initial AI capability type, and/or a capability quantization value offset of the changed AI capability value relative to the initial AI capability value.

According to a fifth aspect of embodiments of the present disclosure, there is provided a communication processing apparatus, including:
a processor; and a memory configured to store instructions executable by the processor;
wherein the processor is configured to perform the communication processing method according to the first aspect or any implementation of the first aspect.

According to a sixth aspect of embodiments of the present disclosure, there is provided a communication processing apparatus, including:
a processor; and a memory configured to store instructions executable by the processor;
wherein the processor is configured to perform the communication processing method according to the second aspect or any implementation of the second aspect.

According to a seventh aspect of embodiments of the present disclosure, there is provided a non-transitory computer readable storage medium, wherein when instructions in the storage medium are executed by a processor of a mobile terminal, the mobile terminal is caused to perform the communication processing method according to the first aspect or any implementation of the first aspect.

According to an eighth aspect of embodiments of the present disclosure, there is provided a non-transitory computer readable storage medium, wherein when instructions in the storage medium are executed by a processor of a network device, the network device is caused to perform the communication processing method according to the second aspect or any implementation of the second aspect.

It is understood that the term "plurality" in the present disclosure refers to two or more, and other quantifiers are similar. The word "and/or" describes a relationship of associated objects, indicating that there can be three relationships, for example, A and/or B means: A alone, B alone, and A and B together. The character "/" generally indicates that the associated objects before and after "/" is in an "or" relationship. The singular forms "a/an", "said" and "the" are also intended to include plural forms, unless the context clearly indicates otherwise.

It is further understood that the terms "first", "second", etc. are used to describe a variety of information, but the variety of information should not be limited to these terms. These terms are used only to distinguish information of the same type from one another and do not indicate a particular order or level of importance. In fact, the expressions "first" and "second" can be used interchangeably. For example, without departing from the scope of the present disclosure, AI capability information may also be referred to as second information, and similarly, second information may also be referred to as AI capability information.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

It is further understood that although the operations are depicted in the accompanying drawings in a particular order in embodiments of the present disclosure, this should not be construed as requiring that the operations be performed in the particular order shown or in serial order, or that all of the operations shown be performed to obtain the desired results. Multitasking and parallel processing may be advantageous in particular environments.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the present disclosure only be limited by the appended claims.

What is claimed is:
1. A communication processing method, comprising:
sending, by a terminal, Artificial Intelligence (AI) capability information in response to a change in an AI capability of the terminal, wherein the AI capability information comprises information related to the change in the AI capability of the terminal,
wherein the AI capability information comprises information indicating a changed AI capability value of the terminal;
wherein sending the AI capability information comprises:
sending the AI capability information based on a first unicast signaling; and
wherein the information indicating the changed AI capability value of the terminal comprises: the changed AI capability value or an offset value between the changed AI capability value and an initial AI capability value.
2. The communication processing method according to claim 1, wherein the AI capability information is characterized by a capability quantification value, and different capa- bility quantification values correspond to different AI capability types or different AI capability values.

3. The method according to claim 2, wherein the AI capability information comprises a capability quantization value matching a changed AI capability type, or a capability quantization value matching a changed AI capability value; or
wherein the AI capability information comprises a capability quantization value offset of a changed AI capability type relative to an initial AI capability type, or a capability quantization value offset of a changed AI capability value relative to an initial AI capability value.

4. A communication processing apparatus, comprising:
a processor; and
a memory configured to store instructions executable by the processor;
wherein the processor is configured to perform a communication processing method according to claim 1.

5. A communication processing method, comprising:
receiving, by a network device, Artificial Intelligence (AI) capability information, wherein the AI capability information comprises information related to a change in an AI capability of a terminal; and
determining, by the network device, information matching the changed AI capability of the terminal based on the AI capability information,
wherein the AI capability information comprises information indicating a changed AI capability value of the terminal;
wherein receiving the AI capability information comprises:
receiving the AI capability information based on first unicast signaling; and
wherein the information indicating the changed AI capability value of the terminal comprises: the changed AI capability value or an offset value between the changed AI capability value and an initial AI capability value.

6. The communication processing method according to claim 5, wherein the AI capability information is characterized by a capability quantification value, and different capability quantification values correspond to different AI capability types or different AI capability values.

7. The communication processing method according to claim 6, wherein the AI capability information comprises a capability quantization value matching a changed AI capability type, or a capability quantization value matching a changed AI capability value; or
wherein the AI capability information comprises a capability quantization value offset of a changed AI capability type relative to an initial AI capability type, or a capability quantization value offset of a changed AI capability value relative to an initial AI capability value.

8. A communication processing apparatus, comprising:
a processor; and
a memory configured to store instructions executable by the processor;
wherein the processor is configured to perform the communication processing method according to claim 5.

9. A communication processing method, comprising:
sending, by a terminal, Artificial Intelligence (AI) capability information in response to a change in an AI capability of the terminal, wherein the AI capability information comprises information related to the change in the AI capability of the terminal,
wherein the AI capability information comprises an AI capability type that the terminal has;
wherein sending the AI capability information comprises:
sending the AI capability information based on a third unicast signaling; and
wherein the method further comprises:
receiving a request, wherein the request is configured to request to report an AI capability value associated with a specified AI capability type; and
reporting the AI capability value associated with the specified AI capability type.

10. The communication processing method according to claim 9, wherein the AI capability type is characterized by a bit sequence, the bit sequence comprises a bit for indicating the AI capability type, and different values of the bit are used to characterize different AI capability types.

11. A communication processing apparatus, comprising:
a processor, and
a memory configured to store instructions executable by the processor;
wherein the processor is configured to perform the communication processing method according to claim 9.

12. A communication processing method, comprising:
receiving, by a network device, Artificial Intelligence (AI) capability information, wherein the AI capability information comprises information related to a change in an AI capability of a terminal; and
determining, by the network device, information matching the changed AI capability of the terminal based on the AI capability information,
wherein the AI capability information comprises an AI capability type that the terminal has;
the receiving the AI capability information comprises:
receiving the AI capability information based on third unicast signaling; and
wherein the method further comprises:
sending a request, wherein the request is configured to request to report an AI capability value associated with a specified AI capability type; and
receiving the AI capability value associated with the specified AI capability type.

13. The communication processing method according to claim 12, wherein the AI capability type is characterized by a bit sequence, the bit sequence comprises a bit for indicating the AI capability type, and different values of the bit are used to characterize different AI capability types.

14. A communication processing apparatus, comprising:
a processor; and
a memory configured to store instructions executable by the processor;
wherein the processor is configured to perform the communication processing method according to claim 12.

* * * * *